May 10, 1966  G. R. ANDERSON  3,250,374
APPARATUS FOR PROCESSING FRUIT
Original Filed July 2, 1962  2 Sheets-Sheet 1
FIG_1
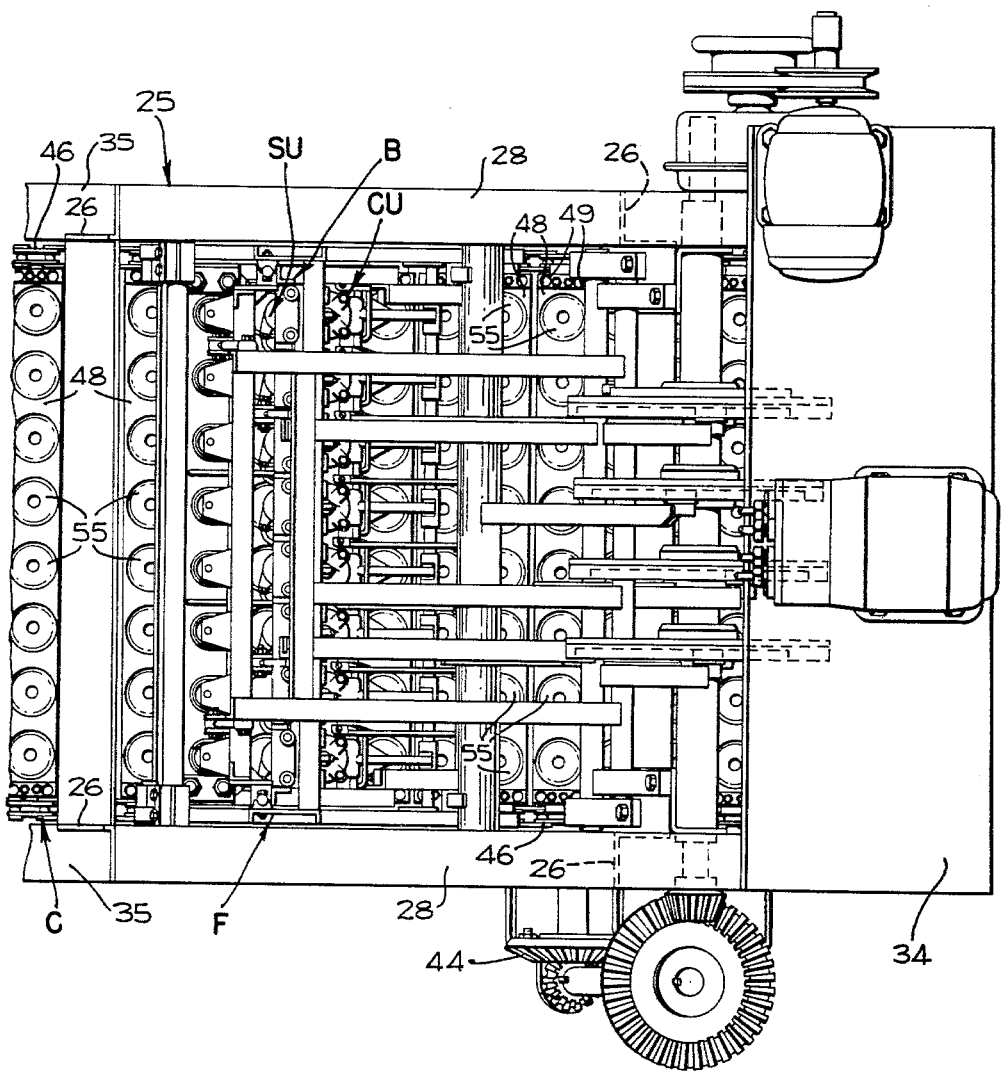
INVENTOR
GERALD R. ANDERSON
BY *Hans G. Hoffmeister*
ATTORNEY

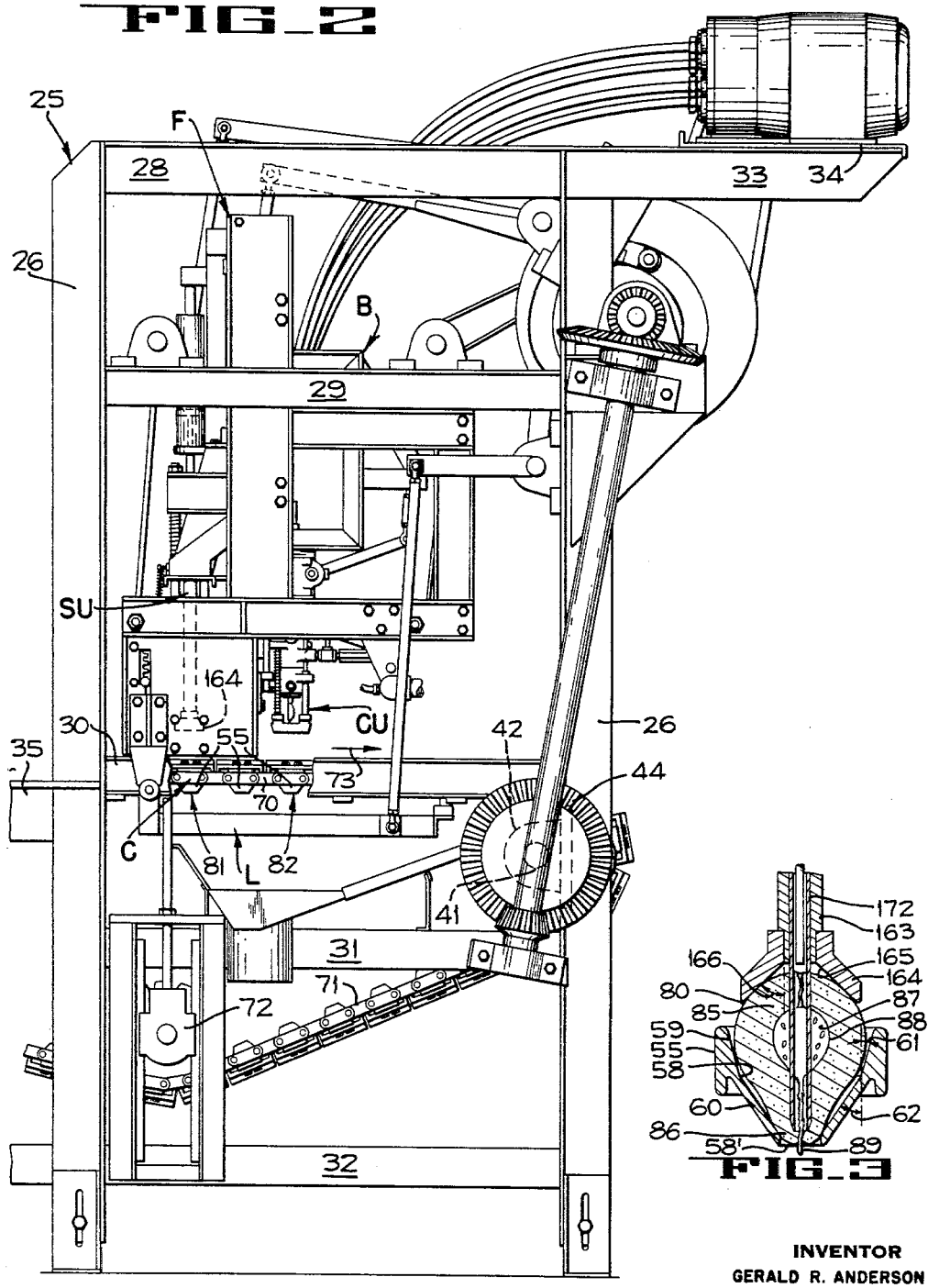

United States Patent Office 3,250,374
Patented May 10, 1966

3,250,374
APPARATUS FOR PROCESSING FRUIT
Gerald R. Anderson, Campbell, Calif., assignor to FMC Corporation, San Jose, Calif., a corporation of Delaware
Original application July 2, 1962, Ser. No. 206,955. Divided and this application Mar. 26, 1965, Ser. No. 452,434
2 Claims. (Cl. 198—33)

This application is a division of application Serial No. 206,955, filed July 2, 1962.

The present invention pertains to apparatus for processing fruit and, more particularly, to an apparatus for orienting fruit.

An object of the present invention is to provide an improved fruit-orienting apparatus.

Another object is to provide a fruit processing apparatus which automatically orients the fruit in a predetermined position prior to stemming and coring the fruit.

These, together with other objects, will become apparent upon reference to the following description and accompanying drawings, in which:

FIG. 1 is a more or less schematic plan of a fruit processing apparatus embodying the principles of the present invention.

FIG. 2 is a side elevation of the apparatus illustrated in FIG. 1, said apparatus including stemming and coring units which are seen in FIG. 2.

FIG. 3 is an enlarged, fragmentary vertical section of a lower portion of a stemming unit as it operates on a pear to remove the stem thereof, particularly showing the configuration of the upper and lower fruit-orienting cups.

Before describing the detailed structure of the present apparatus, it will be helpful to point out certain main components of the apparatus and their general association. Thus, with reference to FIGS. 1 and 2, a fruit supply conveyor C continuously conveys fruit past stemming and coring stations 81 and 82 in the direction of arrow 73. A carrier frame F swings fore and aft above the conveyor in timed relation to the conveyor and mounts a main support bracket B which moves up and down in timed relation to the movements of the carrier frame. A stemming unit SU is mounted on the main support bracket and thus moves upwardly and downwardly with this bracket so as to stem fruit at the stemming station. A coring unit CU is supported by the main support bracket which lowers the coring unit at the coring station into coring position in a stemmed fruit and subsequently lifts the coring unit into retracted position. After the fruit is cored, it is discharged by the conveyor, but, just prior to discharge, it is unseated from the conveyor by a fruit lifter L.

Referring in greater detail to the drawings and to the subject apparatus, a main frame 25 (FIGS. 1 and 2) is provided having pairs of front and rear legs 26 (FIG. 2) on opposite sides of the frame. The frame also provides horizontal upper side braces 28; intermediate side braces 29, 30 and 31; and lower side braces 32 which rigidly interconnect front and rear legs on corresponding sides of the frame. The upper braces include forwardly projecting motor support portions 33, and a horizontal platform 34 is mounted on these support portions. The frame also includes a conveyor support portion 35, which is only partially illustrated at the lower left in FIG. 2. In actual embodiments of the present invention, the conveyor support portion projects rearward from the rear legs a distance equal to about twice the distance between the front and rear legs of the frame.

The fruit supply conveyor C (FIGS. 1 and 2) is mounted in the frame 25 and includes a substantially horizontal, forward drive shaft 41 (FIG. 2) journalled in bearings 42 secured to the front legs 26. The drive shaft is extended transversely of the frame and is vertically spaced between the intermediate braces 30 and 31. A driven bevel gear 44 is secured to an end of the drive shaft, and front sprockets, not shown, are keyed to opposite end portions of the drive shaft. Endless chains 46 are trained around the front sprockets and also around rear sprockets, not shown, the latter being mounted on a rear shaft, not shown, but supported on the conveyor support portion 35 in rearwardly spaced relation to the rear legs 26. Elongated flights 48 interconnect the chains and extend transversely of the frame, with each flight having a pair of aligned holes 49 in each end portion thereof.

The fruit conveyor C also includes a plurality of fruit supporting cups 55 (FIG. 1) integrally formed in each of the transverse flights 48. The cups of each flight constitute a row of cups extending transversely of the conveyor with the spacing between adjacent cups in each row being substantially the same. Considering all of the flights, there are a plurality of lanes of cups with each lane including longitudinally aligned cups of the several flights and with the spacing between adjacent cups in each lane being substantially the same. The illustrated embodiment of the subject invention provides eight lanes of cups, but it is to be understood that the invention is not limited to this number of lanes nor even to a plurality of lanes.

The configuration of each fruit supporting cup 55 has significance and is best illustrated in FIG. 3. Each cup has an inverted, frusto-conical, inner wall 58 circumscribing an upper fruit receiving socket and a lower opening 58'. The inner wall is divided into upper and lower portions 59 and 60, respectively, defining acute angles 61 and 62 with a vertical line. Although angles 61 and 62 of respectively fifteen and thirty-five degrees have proved to be successful, the invention is not limited to these specific angles.

Returning now to other features of the fruit conveyor C (FIG. 2), it has an upper horizontal run 70 positioned between the intermediate side braces 30 and a lower run 71 extending rearward from the front sprockets around a chain tightener 72 (FIG. 2) to the rear sprockets, not shown, on the support portion 35. The conveyor is driven, in a manner to be described, so as to move the upper run in a forward direction, as indicated by the arrow 73.

The upper run 70 of the described conveyor C is employed to carry fruit 80 (FIG. 3) past stemming and coring stations 81 and 82, respectively (FIGS. 2 and 1) above the conveyor. Although the principles of the subject invention are applicable to various fruits, the present embodiment is conveniently described as applied to the stemming and coring of pears. For identification and subsequent reference, each pear (FIG. 3) to be processed has a blossom or butt end 85, an opposite stem end 86, an internal seed cell 87 located within a core cavity or pocket 88, and a stem 89. The pears are individually supported in the cups 55 with their stem ends down. If the stem ends of these pears are sufficiently narrow, they project through the openings 58'.

It is of interest to note that in actual practice of the subject invention, the pears 80 are peeled before being stemmed and cored and are automatically fed into the cups 55. Of course, the pears can be manually placed in the cups by attendants, not shown, standing alongside of the conveyor support portion 35 (FIG. 1). Also, although the pears need not be peeled prior to stemming and coring according to the subject invention, peeling, especially if by lye dipping, does make them slippery, a characteristic that aids in positioning the pears in their cups. That is, as each pear travels on the conveyor toward the stemming station 81, it lies against its respective cup wall 58 (FIG. 3) with its stem blossom axis usually slightly inclined with respect to the vertical axis of the cup. In a manner to be subsequently described, each pear is moved into coaxial alignment with its cup axis during the stemming and coring operation and surface slipperiness does facilitate such movement.

As explained in the parent application which is incorporated by reference herein, a fruit centering and seating cup 164 (FIG. 2) is mounted on the lower end of a tubular member 163 (FIG. 3) which is mounted for vertical reciprocating movement in the stemming unit SU. The cup 164 provides an inner, frusto conical wall 165 circumscribing a socket. Preferably, the wall of the seating cup defines an angle 166 (FIG. 3) of approximately forty-five degrees with a vertical; however, as in the case of the fruit supporting cups 55, the invention is not limited to the specified angle of the inner wall. When its coaction with the fruit supporting cup is described hereinafter, the importance of the construction of the seating cup will be appreciated.

As each stemming unit SU descends toward an aligned supporting cup 55 therebelow, the fruit seating and centering cup 164 is the first to engage (FIG. 3) the blossom end 85 of a pear 80 in the supporting cup. It is a feature of the subject apparatus that the seating and supporting cups 164 then move the pear into an upright position with its stem blossom axis coaxial with the stemming tube 172; the cups also hold the pear firmly in this axially upright position during the stemming operation. The angles 61, 62, and 166 of the cups are chosen so as to align and to hold the fruit with maximum effectiveness; optimum angles for pears are disclosed above. Ideally, the pears are peeled and wet so that surface friction between the pear and the cups is minimized.

Although a preferred embodiment of the present invention has been shown and described, it will be understood that the various changes and modifications may be made in the details thereof without departing from the spirit and the scope of the appended claims.

I claim:
1. In an apparatus for processing slippery pears, a frame, a substantially horizontal conveyor mounted in said frame and including a lower cup providing an internal downwardly convergent wall having a lower frusto-conical surface adapted to loosely receive the stem end of a pear and an upper frusto-conical surface forming an extension of said lower wall and being inclined away from a vertical position less than said lower surface to limit the lateral movement of the butt end of a pear, said lower cup being adapted for loosely supporting a pear in axially tipped position, a bracket mounted in said frame above said conveyor for movement toward and away from said conveyor, and a pear processing unit mounted on said bracket and including an upper cup providing an internal, upwardly converged wall for engaging the pear in said lower cup upon movement of said bracket toward said conveyor and for slidably moving said pear relative to the wall of said lower cup to bring the axis of the pear into axial alignment with said cups.

2. Apparatus according to claim 1 wherein said lower frusto-conical wall surface is disposed at approximately 35 degrees to the vertical and said upper frusto-conical wall surface is disposed at approximately 15 degrees to the vertical.

References Cited by the Examiner
UNITED STATES PATENTS
2,299,137 10/1942 Geren _____ 146—52
2,907,442 10/1959 Monje.
2,975,811 3/1961 Kugler.

EVON C. BLUNK, *Primary Examiner.*

EDWARD A. SROKA, *Examiner.*